United States Patent
Yoon et al.

(10) Patent No.: US 6,854,660 B2
(45) Date of Patent: Feb. 15, 2005

(54) AIR CONDITIONER CONTROL SYSTEM USING A PUBLIC SWITCHED TELEPHONE NETWORK AND METHOD FOR OPERATING THE SAME

(75) Inventors: Sang Chul Yoon, Kyungki-do (KR); Duck Gu Jeon, Seoul (KR); Jae Sik Jung, Seoul (KR); Jae Hwan Kwon, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/677,304

(22) Filed: Oct. 3, 2003

(65) Prior Publication Data

US 2004/0068994 A1 Apr. 15, 2004

(30) Foreign Application Priority Data

| Oct. 12, 2002 | (KR) | 10-2002-0062271 |
| Oct. 12, 2002 | (KR) | 10-2002-0062270 |
| Oct. 23, 2002 | (KR) | 10-2002-0064946 |

(51) Int. Cl.[7] .............................................. G05D 23/00
(52) U.S. Cl. ...................... 236/51; 62/126; 340/870.17; 379/102.05; 455/419
(58) Field of Search ............................ 236/51; 62/126; 340/870.17; 379/102.05; 455/419

(56) References Cited

U.S. PATENT DOCUMENTS

| 5,318,224 | A | * | 6/1994 | Darby et al. .................. 236/47 |
| 5,386,461 | A | * | 1/1995 | Gedney ................. 379/102.05 |
| 5,544,036 | A | * | 8/1996 | Brown, Jr. et al. ..... 340/825.24 |
| 5,915,026 | A | * | 6/1999 | Mankovitz .................. 713/168 |
| 6,216,956 | B1 | * | 4/2001 | Ehlers et al. ................. 236/47 |
| 6,535,123 | B2 | * | 3/2003 | Sandelman et al. ......... 340/506 |
| 6,619,055 | B1 | * | 9/2003 | Addy .......................... 62/126 |

* cited by examiner

Primary Examiner—Marc Norman
(74) Attorney, Agent, or Firm—Greenblum & Bernstein, P.L.C.

(57) ABSTRACT

An air conditioner control system and method uses a PSTN (Public Switched Telephone Network). The system allows a remote control operator to control a plurality of air conditioners through the PSTN by providing receiving modules connected to the air conditioners which have unique IDs assigned thereto and which all use same telephone line. In an electronic device, a control program is driven to control and monitor the air conditioners. A transmitting module connected to the electronic device converts and codes a control command signal into a DTMF (Dual Tone Multi-Frequency) signal, and transmits the DTMF signal through the PSTN to a receiving module connected to a corresponding air conditioner, so that the air conditioner can be remotely controlled.

17 Claims, 5 Drawing Sheets

|  | 7 | 6 | 5 | 4 | 3 | 2 | 1 | 0 | description |
|---|---|---|---|---|---|---|---|---|---|
| TX0 | - | 0 | 0 | 0 | 0 | 0 | 0 | 0 | entire release |
|  | - | 0 | 0 | 0 | 0 | 0 | 0 | 1 | No.1 air conditioner selection |
|  | - | 0 | 0 | 0 | 0 | 0 | 1 | 0 | No.2 air conditioner selection |
|  | - | 0 | 0 | 0 | 0 | 1 | 0 | 0 | No.3 air conditioner selection |
|  | - | 0 | 0 | 0 | 1 | 0 | 0 | 0 | No.4 air conditioner selection |
|  | - | 0 | 0 | 1 | 0 | 0 | 0 | 0 | No.5 air conditioner selection |
|  | - | 0 | 1 | 0 | 0 | 1 | 0 | 0 | No.6 air conditioner selection |
|  | - | 0 | 1 | 1 | 1 | 1 | 1 | 1 | entire selection |
| TX1 | checksum 1 ||||||||  |
| TX2 | operating mode ||||||||  |
| TX3 | setting temperature ||||||||  |
| TX4 | Error Code ||||||||  |
| TX5 | checksum 2 ||||||||  |

AIR CONDITIONER CONTROL SYSTEM USING A PUBLIC SWITCHED TELEPHONE NETWORK AND METHOD FOR OPERATING THE SAME

CROSS-REFERENCE TO RELATED APPLICATIONS

The present application claims priority under 35 U.S.C. §119 of Korean Applications No. 2002-62270, filed on Oct. 12, 2002; No. 2002-62271, filed on Oct. 12, 2002; and No. 2002-64946, filed on Oct. 23, 2002, the disclosures of which are expressly incorporated by reference herein in their entireties.

BACKGROUND OF THE INVENTION

1. Field of the Invention

The present invention relates to an air conditioner control system that uses a PSTN (Public Switched Telephone Network) and a method for operating the same. More particularly the present invention relates to an air conditioner control system, and a method for operating the same, in which a remote control operator is able to control a plurality of air conditioners through the PSTN. In particular, receiving modules having unique IDs (Identities) are connected to the different air conditioners which use the same telephone line.

2. Description of the Related Art

Conventionally, an air conditioner includes an indoor device and an outdoor device. A coolant circulated through the indoor and outdoor devices establishes a thermal cycle of compression, condensation, expansion and evaporation In this manner, conditioning of indoor air is performed by a cooling or heating operation. When central management of the cooling/heating operation in a large building is required, the air conditioner system may include indoor and outdoor devices installed in each room or area within the building. When a separate air conditioner is installed in each room of a home or building, an operator must go to each room to input a control command into the air conditioner and identify a control state of the air conditioner.

A multiple air conditioner system has been developed to perform indoor air conditioning while reducing installation and maintenance costs of a plurality of air conditioners. Such a multiple air conditioner system includes a plurality of indoor devices provided in respective rooms and a single outdoor device. The outdoor device detects operating states of the indoor devices and controls the circulation of coolant to the indoor devices. Such a multiple air conditioner system is generally provided in a large building. However, a conventional air conditioner including an indoor device and an outdoor device can be provided in each separate room to perform air conditioning.

Home network systems have recently been developed in which a plurality of home appliances are connected to an internal network provided in a home. The network is connected to a server appliance having data processing capability, and which controls the home appliances. All of the home appliances connected to the network can thus be controlled in a centralized control manner. The server appliance may be connected to an external Internet network. A remote control operator controls the home appliances from a remote location by accessing the server appliance through the Internet network. The remote control operator can input a control command and identify an operating state of a home appliance.

For such a home network system to operate effectively, very high-speed Internet networks must be regionally provided, and internal home networks must be provided within homes or buildings. However, home network systems are not readily applicable to large buildings or apartments where the availability of Internet networks is insufficient.

Figure 1:
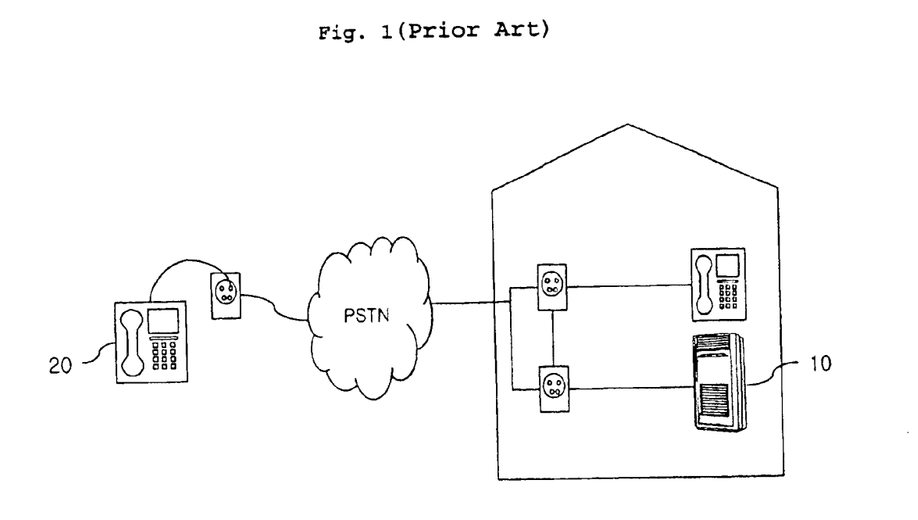
FIG. 1 is a view schematically showing the configuration of a conventional air conditioner control system using a PSTN (Public Switched Telephone Network)

FIG. 1 is a view illustrating the configuration of a conventional air conditioner control system using a PSTN (Public Switched Telephone Network). As shown in FIG. 1, such a conventional air conditioner control system can control a multiple air conditioner system or a plurality of air conditioners independently provided in different rooms. An air conditioner 10 is connected to a telephone terminal so that a remote control operator can send a call signal to a building or home in which the air conditioner 10 is located to establish a call connection. By manipulating numeric keys or buttons of a telephone 20 to input simple control commands, such as an power on/off command, the control command is sent to the air conditioner 10 through the PSTN. In this manner, a few simple functions of the air conditioner 10 can be remotely controlled.

However, in the conventional air conditioner control system using the PSTN, the remote control operator can only input the control command to the telephone 20. Because the control commands are defined by a manipulation sequence of numeric keys or buttons, only simple control commands are possible. Accordingly, there is a problem in that a detailed control command cannot be remotely input or transmitted. Moreover, in the conventional air conditioner control system using the PSTN, only a single air conditioner can be controlled through a single telephone number. However, a plurality of air conditioners cannot be simultaneously controlled within a building using the single telephone number.

SUMMARY OF THE INVENTION

Therefore, the present invention has been made in view of the above problems, and it is an object of the present invention to provide an air conditioner control system using a PSTN (Public Switched Telephone Network) and a method of operating the same. The system and method include receiving modules connected to a plurality of air conditioners in order to control the air conditioners connected to a single telephone number. The air conditioners are controlled from a remote site by selecting unique IDs assigned to the air conditioners. Time and cost for controlling and managing the air conditioners is reduced, and various detailed functions of an air conditioner can be controlled by an electronic device having an air conditioner control program embedded therein.

In accordance with one aspect of the present invention, the above and other objects can be accomplished by the provision of an air conditioner control system that uses a PSTN to control a plurality of air conditioners. The control system includes an electronic device having a control program driven to control the plurality of air conditioners, installed within a building. A transmitting module converts and codes an initial control command signal input through the control program into a DTMF (Dual Tone Multi-Frequency signal) and transmits the DTMF signal to the PSTN, and a receiving module receives the DTMF signal transmitted from the transmitting module over the PSTN and transmits a final control command signal based on the DTMF signal to an air conditioner identified in the DTMF signal.

In accordance with another aspect of the present invention, an air conditioner control system that uses a PSTN to control a plurality of air conditioners is provided. The control system includes a telephone that generates and transmits a DTMF (Dual Tone Multi-Frequency) signal representing control commands for the air conditioners through manipulation of a plurality of buttons or keys, and a plurality of receiving modules that each receive the DTMF signal from the telephone through the PSTN and transmit a control command signal based on the DTMF signal to an air conditioner identified in the DTMF signal.

In accordance with yet another aspect of the present invention, a method of operating an air conditioner control system that uses a PSTN is provided. The method includes receiving an initial control command signal including a telephone number connected to at least one air conditioner to be controlled and control command information input through an electronic device or a telephone; converting and coding the initial control command signal into a DTMF signal; transmitting the DTMF signal to a destination of the telephone number through the PSTN; receiving the DTMF signal with a receiving module connected to the air conditioner; converting and decoding the received DTMF signal into a final control command signal; transmitting the final control command signal to the air conditioner; and transmitting operating state data of the air conditioner operated according to the final control command signal to the electronic device or the telephone through the PSTN.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 2:
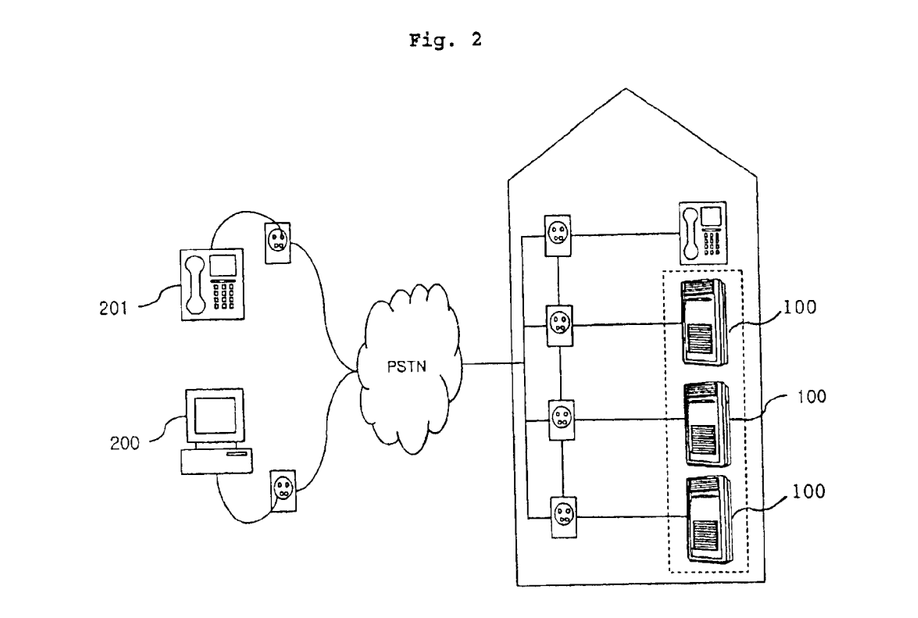
FIG. 2 is a view schematically showing the configuration of an air conditioner control system using a PSTN in accordance with the present invention.
Figure 3:
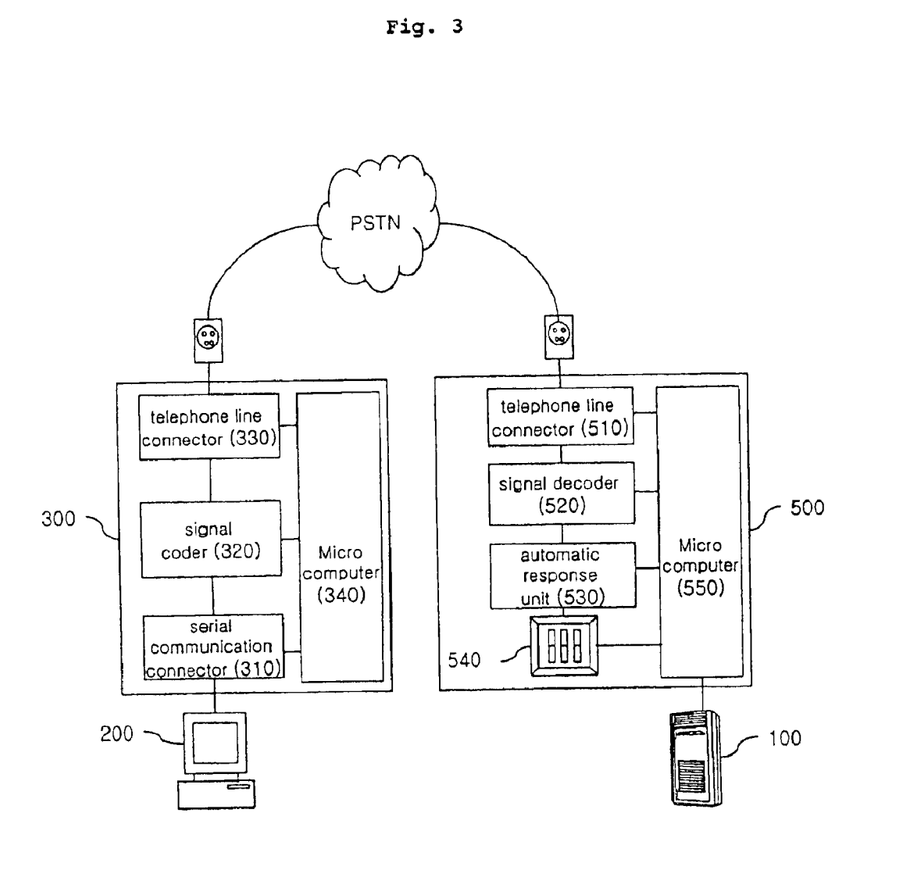
FIG. 3 is a view illustrating the configuration of a first embodiment of an air conditioner control system in accordance with the present invention.

FIG. 2 shows the configuration of an air conditioner control system using a PSTN (Public Switched Telephone Network) in accordance with the present invention. FIG. 3 shows the configuration of a first embodiment of an air conditioner control system in accordance with the present invention.

A plurality of air conditioners 100, provided at different locations in a building, are commonly connected to a single telephone line terminal (i.e., commonly coupled to a single telephone number) by a connection network physically connected to the telephone line. The telephone line terminal is in turn connected to the PSTN.

Moreover, different unique IDs (Identities) are assigned to each of the air conditioners 100 connected to the same telephone line for identifying the different air conditioners. As shown in FIG. 3, a DIP (Dual Inline Package) switch 540 is provided for identification purposes. A DIP switch is an environment setup switch used for correctly operating a designated peripheral device, such as a disk drive or a printer. The different unique IDs assigned to the air conditioners 100 are used by an operator who calls the unique IDs to select and operate a specific air conditioner, or all the air conditioners, from a remote location.

The PSTN is a telephone network for providing voice and data communication service to a number of subscribers through a switching center as a conventional subscription telephone service. If a calling party (sender) dials and inputs a telephone number, a local switch switches the calling party's call to a destination corresponding to the telephone number such that the calling party can communicate with a called party through a call connection.

A remote electronic device 200 can output information representing operating states of the air conditioners, and drives a control program allowing input of control commands. The electronic device 200 includes a wired or wireless modem, which can be either of a built-in or stand-alone variety, for connecting to the PSTN. The electronic device 200 includes a key input device (not shown) for receiving a control command input through the control program, and a screen display device (not shown) for outputting or displaying the operating state information resulting from an air conditioner being operated in response to a control command.

FIG. 3 is a view illustrating a first embodiment of an air conditioner control system that uses the PSTN in accordance with the present invention.

As shown in FIG. 3, the electronic device 200 may be a personal computer. The control program, which is designed as a GUI (Graphic User Interface) for convenient use and manipulation, is installed in the personal computer to allow an operator to remotely control the air conditioners. Moreover, the remote operator can identify, from the screen display unit, operating state data for an air conditioner which is operated in response to a control command input through the personal computer.

The remote control operator manipulates the electronic device 200 to input a control command which includes a telephone number associated with an air conditioner to be controlled, an ID assigned to the air conditioner, and control information.

The control command input through the electronic device 200 is sent to a transmitting module 300 connected to a serial port of the electronic device 200. The transmitting module 300 serves as a kind of a modem for converting and coding the control command into a DTMF (Dual Tone Multi-Frequency) signal. A serial communication between the electronic device 200 and the transmitting module 300 conforms to, e.g. an RS-232C standard, or any other appropriate communication standard.

A DTMF signal is generated when a button or key of a telephone is pressed and the signal is transmitted to a central office. Each key pressed by a user generates two tones having specific frequencies, including one tone of a high frequency and another tone of a low frequency. Accordingly, which key on the telephone is pressed can be detected through the dual-tone frequencies.

The transmitting module 300 connected to the electronic device 200 in a serial communication manner includes a serial communication connector 310 for receiving a control command signal input from the electronic device 200. The transmitting module 300 also includes a signal coder 320 that codes and converts the control command signal received by the serial communication connector 310 into a DTMF signal, and a telephone line connector 330 that connects to the PSTN for externally outputting the DTMF signal coded and converted by the signal coder 320. A microcomputer 340 in the transmitting module 300 controls the flow of signals so that the control command signal received by the serial communication connector 310 can be transmitted through or over the PSTN.

Figure 4:
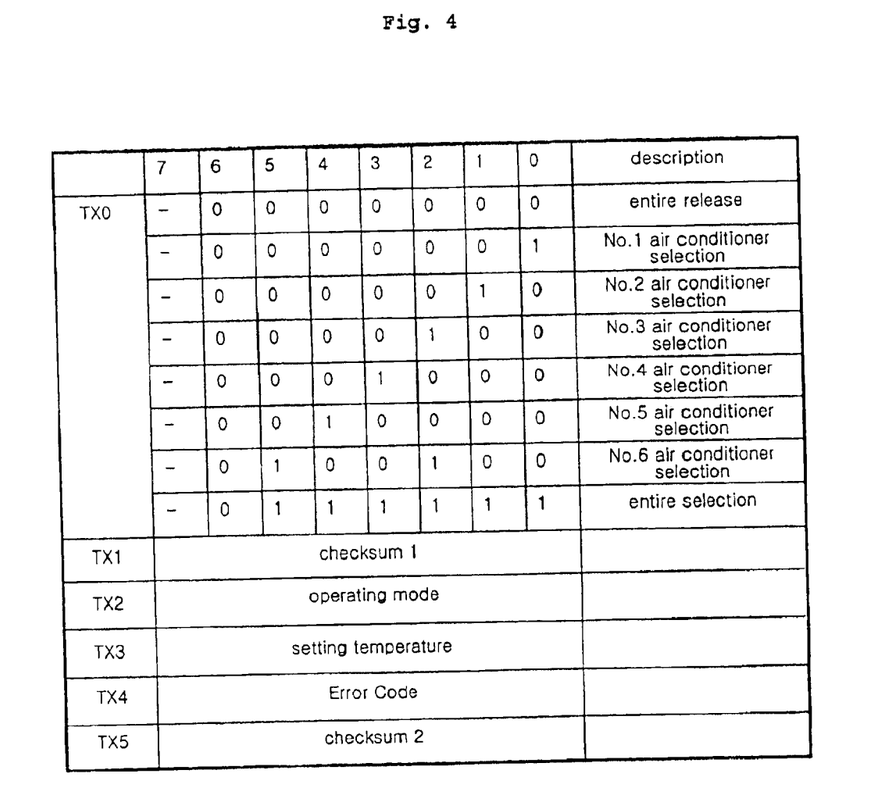
FIG. 4 is a view illustrating a control command signal configuration for the air conditioner control system in accordance with the present invention.

The control command signal transmitted from the electronic device under the control of microcomputer 340 of the transmitting module 300 consists of an 8-bit stream. The control command includes a packet TX0 (FIG. 4) that indicates IDs of air conditioners to be controlled according to a combination of consecutively arranged bits, and packets TX1 to TX5 that indicate control information for the air conditioners to be controlled. FIG. 4 is a view illustrating a control command signal configuration for the air conditioner control system using the PSTN in accordance with the present invention.

The packet TX0 is configured such that any combination or all of the air conditioners can be designated for selection according to the combination of arranged bits. In response to the packet TX0, the operating states of the selected air conditioners can be initialized to release all commands. The packet TX0 is based on a basic unit of 8 bits. A most significant bit of the 8 bits is a transmitter ID indicating whether the device transmitting the control command is the electronic device 200 or the telephone 201. The lower 7 bits are IDs of air conditioners to be controlled. The packets TX1 to TX5 include control information. Any suitable control information can be included, such as operating modes or setting temperatures. The packets TX1 to TX5 can also include intermediate checksum values.

The transmitting module 300 transmits a DTMF signal to the PSTN through the telephone line connector 330. A receiving module 500 for an air conditioner is connected to an associated telephone number to receive the DTMF signal from the PSTN and transmit the received DTMF signal to an air conditioner 100. A separate receiving module 500 may be provided for each different air conditioner, or a common receiving module may be provided for all the conditioners.

The receiving module 500 is connected to or provided in each air conditioner 100. The receiving module 500 receives and transfers a signal from the PSTN. The ID of each air conditioner is set and input into the DIP switch 540, so that the receiving module 500 can receive a control command signal containing a unique ID set in the DIP switch 540.

The receiving module 500 connected to the PSTN through the telephone line connector 510 receives a DTMF signal from the transmitting module 300. A signal decoder 520 converts and decodes the received DTMF signal into a control command signal that can be transmitted to an air conditioner.

The DIP switch 540 is connected to each air conditioner and assigns unique IDs to identify each of the air conditioners. If a unique ID contained in the received control command signal matches an ID set and input in the DIP switch 540, the signal decoder 520 converts and decodes the received DTMF signal into a control command signal for transmission to the identified air conditioner. A microcomputer 550 in the receiving module 500 can output operating state data of the air conditioner operated according to the control command signal for transmission to the electronic device 200 on the telephone 201 through the PSTN.

The receiving module 500 further includes an automatic response unit 530. The automatic response unit 530 converts the operating state data received from the air conditioner into a voice signal if the control command signal was transmitted from the telephone 201.

Figure 5:
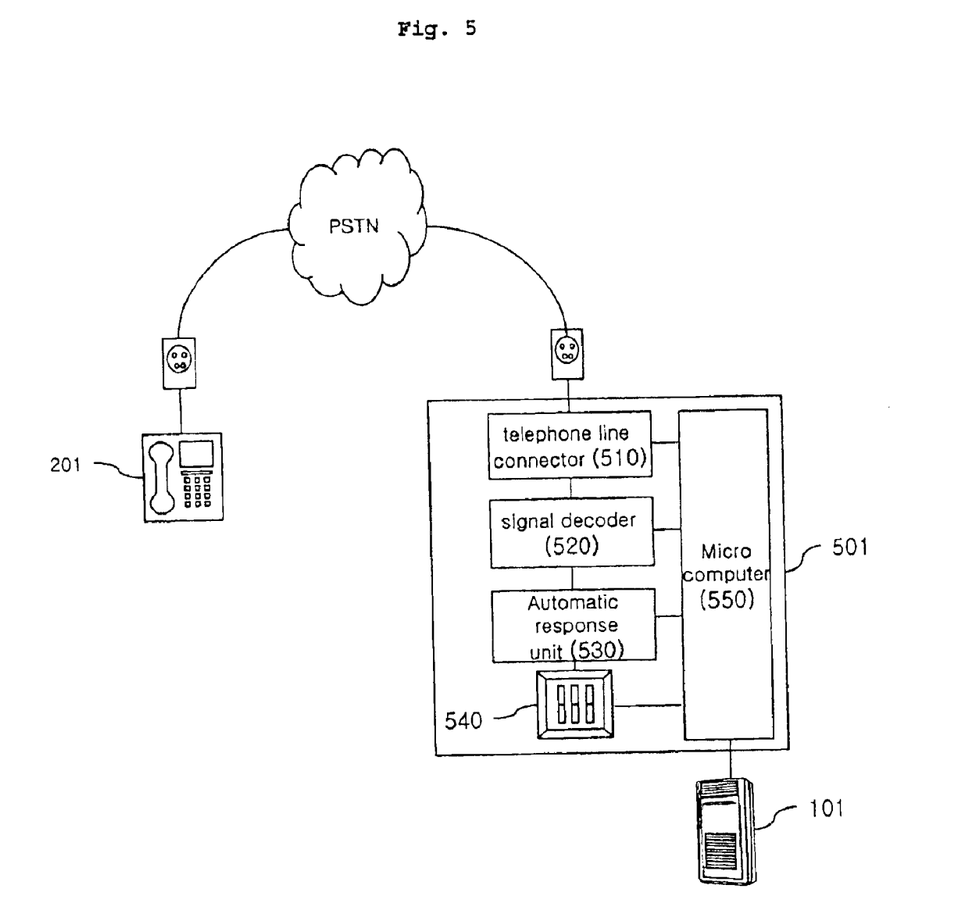
FIG. 5 is a view illustrating the configuration of a second embodiment of the air conditioner control system in accordance with the present invention.

As described above, the first embodiment of the air conditioner control system shown in FIG. 3 includes the electronic device 200, the transmitting module 300, the PSTN, the receiving module 500 and the air conditioners 100. When the control command is input through the telephone 201 instead of the electronic device 200, the transmitting module 300 is unnecessary since the telephone 201 directly transmits a DTMF signal in response to the operation of a telephone key. The second embodiment of the air conditioner control system using the PSTN in accordance with the present invention is shown in FIG. 5.

The air conditioner control system in accordance with the second embodiment includes a plurality of air conditioners 101, a telephone 201 for inputting a control command signal for the air conditioners by manipulating a plurality of buttons or keys to generate a DTMF signal and a receiving module 501 to receive the DTMF signal transmitted by the telephone 201 through the PSTN. The receiving module 501 sends the control command signal to an air conditioner 101 so that the air conditioner 101 can operate in response to the control command signal. In response to operating state data of the air conditioner 101, an automatic response unit 530 converts the operating state data into a voice signal for transmission to the telephone 201, thereby allowing the remote control operator to easily identify a control state and a result of the control. The receiving module 501 in accordance with the second embodiment has the same configuration as the receiving module 500 in accordance with the first embodiment and can be provided individually for each air conditioner 101 or a single receiving module 500 for all of the air conditioners can be provided.

Figure 6:
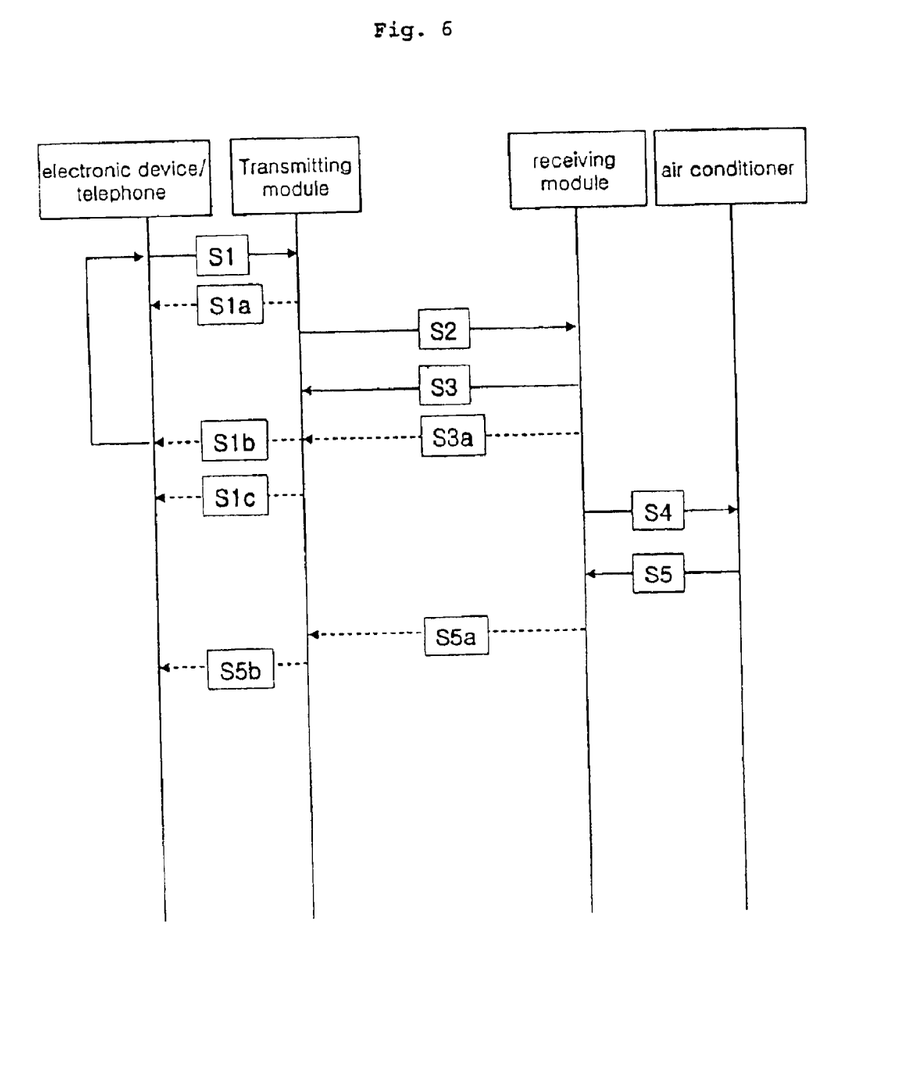
FIG. 6 is a view illustrating a flow of signals in a method of operating the air conditioner control system using the PSTN in accordance with the present invention.

A method of operating the air conditioner control system using the PSTN in accordance with the present invention will be described with reference to FIG. 6.

Initially, a telephone number connected to air conditioners to be controlled and a control command signal are input through the electronic device or the telephone. If a transmitter of the control command signal is the electronic device, the transmitting module connected to the electronic device receives the control command signal (S1).

If the control command signal is not completely received within a predetermined time, the transmitting module generates a time-out error and notifies the electronic device that the control command signal has not been received (S1a). Further, if an error is detected in the control command signal, the transmitting module notifies the electronic device that the error has been detected in the control command signal and requests the electronic device to retransmit the control command signal (S1b). On the other hand, if the control command signal has been successfully received without an error, the transmitting module notifies the electronic device that the control command signal has been successfully received (S1c).

After the control command signal is converted and coded into a DTMF signal, the DTMF signal is transmitted over the PSTN to a telephone number connected to an air conditioner to be controlled (S2). Where the DTMF signal is directly transmitted by the telephone as in the second embodiment, no conversion or coding is necessary.

The receiving module connected to the air conditioner receives the DTMF signal and starts a timer upon receiving the DTMF signal. If the receiving module does not completely receive the DTMF signal for a predetermined time, the receiving module generates a time-out error and requests the transmitter to retransmit the control command signal (S3). The receiving module identifies a checksum at an intermediate time-point and a completion time-point when the DTMF signal is received and checks for a transmission error (S3a).

The checksum is to check the accuracy of transmitted data. The transmitting module adds a sum of all data items contained in the control command signal to a tail of the control command signal. The receiving module sums up the data items one by one while receiving the control command signal and determines whether the sum of the received data items matches the sum contained in the tail of the control command signal.

After converting the DTMF signal into the control command signal, the receiving module transmits the control command signal to the designated air conditioner (S4). At this time, the receiving module compares an ID contained in the DTMF signal with an ID of the air conditioner assigned by the DIP switch. If the IDs are the same, the DTMF signal is converted and decoded into the control command signal and the control command signal is transmitted to a main controller of the designated air conditioner.

The air conditioner performs a control operation in response to the control command signal and then generates operating state data of the control operation for transmission to the receiving module. If a transmitter ID contained in the control command signal corresponds to the electronic device, the receiving module transmits the operating state data to the electronic device via the transmitting module. If a transmitter ID contained in the control command signal corresponds to the telephone, the receiving module converts the operating state data into voice data and then transmits the voice data to the telephone (S5).

After checking a transmission error and receiving the operating state data from the air conditioner, the receiving module transmits the state data to the electronic device or telephone (S5a).

The transmitting module of the electronic device, or the telephone, checks for transmission error and receives the operating state data from the receiving module. The telephone outputs the operating state data of the air conditioner by voice, and the electronic device displays information on a screen so that the remote control operator can identify a control state and a result of the control (S5b).

As is apparent from the above description, the present invention provides an air conditioner control system that uses a PSTN (Public Switched Telephone Network) and a method of operating the same. A plurality of air conditioners commonly using the same telephone number are connected to receiving modules having different IDs (Identities). A receiving module receives a control command signal from a remote control operator manipulating an electronic device or telephone, and transmits the control command signal to an air conditioner. Various functions of the air conditioners can be remotely controlled, enabling the air conditioners to be easily managed, saving time, manpower and cost for managing the air conditioners to perform indoor air conditioning.

It should be noted that, although the term "packet" is used herein, any form of network communication is within the scope and spirit of the present invention. It should also be noted that it is within the spirit and scope of the present invention to operate in any suitable wired or wireless network.

Moreover, by the use of the term air conditioner, air heating and cooling devices are included. Further, humidifiers, dehumidifiers and other such device are also included within the scope of the present invention.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An air conditioner control system that uses a PSTN to control a plurality of air conditioners, said control system comprising:

an electronic device having a control program driven to control the plurality of air conditioners;

a transmitting module that converts and codes an initial control command signal input through the control program into a DTMF signal and transmits the DTMF signal to the PSTN; and a receiving module that receives the DTMF signal transmitted from the transmitting module over the PSTN and transmits a final control command signal based on the DTMF signal to an air conditioner identified in the DTMF signal, wherein the receiving module comprises:

a telephone line connector connected to the PSTN that receives the DTMF signal transmitted by the transmitting module;

a signal decoder that converts and decodes the DTMF signal received by the telephone line connector into the final control command signal that can be utilized by the air conditioner; and a microcomputer that transmits the final control command signal converted and decoded by the signal decoder to the air conditioner, and transmits operating state data of the air conditioner operated according to the final control command signal to the PSTN.

2. The air conditioner control system as set forth in claim 1, wherein said electronic device comprises a screen display unit that displays operating state data of the air conditioner, and wherein the control program is implemented by a GUI and displayed on the screen display unit.

3. The air conditioner control system as set forth in claim 1, wherein said transmitting module comprises:

a serial communication connector that serially receives the initial control command signal input into the electronic device;

a signal coder that converts and codes the initial control command signal received by the serial communication connector into the DTMF signal;

a telephone line connector connected to the PSTN that transmits the DTMF signal converted and coded by the signal coder; and a microcomputer that controls a flow of signals such that the initial control command signal received by the serial communication connector is converted and coded by the signal coder and transmitted through the PSTN as the DTMF signal.

4. The air conditioner control system as set forth in claim 3, wherein the control command signal comprises:

a first packet including a unique ID identifying the air conditioner to be controlled; and additional packets including control information.

5. The air conditioner control system as set forth in claim 4, wherein the first packet further includes a command for simultaneously selecting or releasing the air conditioners.

6. The air conditioner control system as set forth in claim 1, wherein the receiving module further comprises:

a DIP switch in which a unique ID assigned to the air conditioner is set and input.

7. The air conditioner control system as set forth in claim 6, wherein the microcomputer transmits the final control command signal to the air conditioner having a unique ID that is the same as the unique ID set and input in the DIP switch.

8. An air conditioner control system that uses a PSTN to control a plurality of air conditioners, said control system comprising:

a telephone that generates and transmits a DTMF signal representing control commands for the air conditioners through manipulation of a plurality of keys; and a plurality of receiving modules that each receive the DTMF signal from the telephone through the PSTN and transmit a control command signal based on the DTMF signal to an air conditioner identified in the DTMF signal.

wherein each of the receiving modules comprises:

a telephone line connector connected to the PSTN to receive the DTMF signal transmitted by the telephone;

a signal decoder that converts and decodes the DTMF signal received by the telephone line connector into the control command signal that can be utilized by the air conditioner; and a microcomputer that transmits the control command signal, converted and decoded by the signal decoder, to the air conditioner, and transmits operating state data of the air conditioner operated according to the control command signal to the PSTN.

9. The air conditioner control system as set forth in claim 8, wherein the receiving module further comprises:

an automatic response unit that converts the operating state data of the air conditioner operated according to the control command signal into voice data and transmits the voice data to the PSTN.

10. The air conditioner control system as set forth in claim 9, wherein the microcomputer is configured to transfer the operating state data of the air conditioner to the automatic response unit for conversion to voice data, only if the control command signal indicates that the telephone transmitted the DTMF signal.

11. The air conditioner control system as set forth in claim 8, wherein the receiving module further comprises:

a DIP switch in which a unique ID assigned to the air conditioner is set and input.

12. The air conditioner control system as set forth in claim 11, wherein the microcomputer transmits the control command signal to the air conditioner having a unique ID that is the same as the unique ID set and input in the DIP switch.

13. A method of operating an air conditioner control system that uses a PSTN, comprising:

receiving an initial control command signal including a telephone number associated with at least one air conditioner to be controlled and control command information input through one of an electronic device and a telephone;

converting and coding the initial control command signal into a DTMF signal;

transmitting the DTMF signal to a destination of the telephone number through the PSTN;

receiving the DTMF signal with a receiving module connected to the air conditioner;

converting and decoding the received DTMF signal into a final control command signal;

transmitting the final control command signal to the air conditioner; and transmitting operating state data of the air conditioner operated according to the final control command signal to one of the electronic device and the telephone through the PSTN.

14. The method as set forth in claim 13, further comprising:

operating a timer upon first receiving the DTMF signal at the receiving module, generating a time-out error if the DTMF signal is not completely received during a predetermined time, and transmitting a retransmission request; and identifying a checksum at an intermediate time-point and at a completion time-point when the DTMF signal is received and checking a transmission error.

15. The method as set forth in claim 13, further comprising:

determining whether a unique ID assigned to the air conditioner matches a unique ID contained in the DTMF signal; and converting and decoding the DTMF signal into the final control command signal and transmitting the final control command signal to the air conditioner if the IDs match.

16. The method as set forth in claim 13, further comprising:

operating the air conditioner to perform a control operation in response to the control command signal;

generating operating state data of the air conditioner and transmitting the generated operating state data to the receiving module;

checking for transmission error and transmitting the operating state data from the receiving module to one of the electronic device and the telephone; and receiving and externally outputting the operating state data from the one of the electronic device and the telephone.

17. The method as set forth in claim 16 further comprising:

transmitting the operating state data to the electronic device if a transmitter ID contained in the control command signal corresponds to the electronic device, and converting the operating state data into voice data for transmission to the telephone if the transmitter ID corresponds to the telephone.

* * * * *